3,770,790
PHENOXYPHENYL SILANES
Harold A. Clark, Midland, Mich., assignor to Dow
Corning Corporation, Midland, Mich.
No Drawing. Filed Nov. 29, 1971, Ser. No. 203,035
Int. Cl. C07f 7/08
U.S. Cl. 260—448.2 B     3 Claims

ABSTRACT OF THE DISCLOSURE

Novel silanes, phenoxyphenyl(diphenyl)methylsilane and phenoxyphenyl(dimethyl)phenylsilane, are inert fluids having a high index of refraction used as the stain media in the microscopic examination of tissue cultures.

---

This invention relates to phenoxyphenyl-substituted silanes.

More particularly, the invention relates to novel organosilanes of the formula

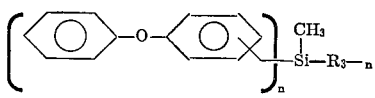

in which R is either a methyl radical or a phenyl radical and $n$ has a value of 1 or 2.

The organosilanes of the invention are conveniently prepared by the reaction of a phenoxyphenyl-containing Grignard reagent with $CH_3R_{3-n}SiCl_n$. The Grignard reagent can be prepared by reacting magnesium chips with p-bromodiphenylether in tetrahydrofuran. This method of preparation is illustrated in detail. These silanes can also be prepared by reacting the appropriate chlorosilane with chlorophenylether in the presence of sodium. The compounds can be isomeric, meta or para or mixtures of such isomers.

The novel organosilanes are inert viscous fluids having a relatively high refractive index. The high refractive index and inertness render the silanes especially suitable as media for the microscopic examination of thin section tissue samples. The fluids are not reactive with the organic tissue and good visual contrast is obtained with slides utilizing the silanes.

The following examples are illustrative of the invention defined in the claims.

EXAMPLE 1

A one-liter, three necked flask fitted with a reflux condenser, addition funnel and mechanical stirrer was charged with 13.4 grams of magnesium chips and 133 ml. of tetrahydrofuran. A solution of 125 grams of p-bromodiphenylether in 100 ml. of tetrahydrofuran was placed in the addition funnel. The contents of the flask were heated to reflux and 10 ml. of the p-bromodiphenylether solution was added. The reaction was initiated by the addition of one ml. of phenyldimethylchlorosilane. The remainder of the bromodiphenylether was added slowly and the reaction proceeded without further external heating.

After the formation of the Grignard reagent was complete, 85.2 grams of phenyldimethylchlorosilane was added slowly from the addition funnel. The coupling reaction was exothermic. After addition of the silane, the reaction mixture was heated for 30 minutes at reflux temperature. The reaction mixture was then cooled, diluted with 100 ml. of toluene and washed four times with 100 ml. portions of water in a separatory funnel. After distillation of the solvents, the product was fractionally distilled at reduced pressure using a two-foot spinning band column to obtain 124.1 grams (82 percent yield) of phenoxyphenyl(phenyl)dimethylsilane having a boiling point of 127° C.–132° C./0.05 mm. Hg and a refractive index ($n_D^{25}$) of 1.5922. The infrared spectrum was consistent with the structure of the silane.

Analysis.—Calculated (percent): Si, 9.20; C, 78.9; H, 6.63—found (percent): Si, 9.22; C, 79.0; H, 6.66.

EXAMPLE 2

The Grignard and coupling reactions were run simultaneously to produce phenoxyphenyl(diphenyl)methylsilane. Magnesium chips (13.4 grams) in 81 ml. of tetrahydrofuran were heated to reflux and 10 ml. of a mixture of 125 grams of p-bromodiphenylether and 118.5 grams of diphenylmethylchlorosilane in 81 ml. of tetrahydrofuran was added. After again heating the contents of the flask to reflux, the reaction began and the remainder of the p-bromodiphenylether/diphenylmethylchlorosilane solution was added at a rate sufficient to maintain reflux temperature without further external heating. The addition of reactants was complete in 30 minutes, after which the reaction mixture was heated at reflux temperature for 45 minutes.

The reaction mixture was worked up as described in Example 1 to obtain 117.3 grams (64% yield) of phenoxyphenyl(diphenyl)methylsilane having a boiling point of 172°–200° C./0.08 mm. Hg and a refractive index ($n_D^{25}$) of 1.6235. The infrared spectrum was consistent with the proposed structure.

Analysis.—Calculated (percent): Si, 7.64; C, 81.9; H, 6.05—found (percent): Si, 7.68; C, 82.2; H, 6.46.

EXAMPLE 3

Phenoxyphenyl(trimethyl)silane was prepared by reacting trimethylchlorosilane with chlorophenylether in the presence of sodium. The reaction product was a mixture of meta and para isomers of phenoxyphenyl(trimethyl)silane having a refractive index ($n_D^{25}$) of 1.5478. The structure was confirmed by analysis.

EXAMPLE 4

Dimethyldichlorosilane was reacted with chlorophenylether in the presence of sodium to obtain an isomeric mixture of meta- and para-diphenoxyphenyl(dimethyl)silane having a refractive index ($n_D^{25}$) of 1.6028.

EXAMPLE 5

To test the suitability of the silanes as mounting media for tissue examination, a sample of formalin-fixed, paraffin-embedded prostate tissue was sectioned and fixed to a microslide. The paraffin was removed with xylene and a drop of phenoxyphenyl(diphenyl)methylsilane was placed on the tissue section. A cover glass was then placed over the prepared specimen. A second specimen was prepared in the same manner except that phenoxyphenyl (dimethyl)phenylsilane was used as the mounting media. For purposes of comparison, a tissue section was mounted with a commercially-available immersion fluid.

A visual examination of the prepared tissue sections was made at 400× with phase contrast techniques being used. The fine structure of epithelial cells remained intact in the presence of the silane fluids and there were no detrimental effects from the use of the fluids. Subsequent examination of these mounted sections showed that the integrity of the epithelial cells was not affected after a duration of seven days.

That which is claimed is:
1. Organosilanes of the formula

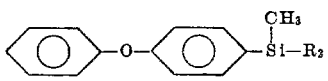

in which R is a methyl or phenyl radical.

2. The organosilane of claim 1 wherein both R substituents are methyl radicals.

3. The organosilane of claim 1 wherein at least one R substituent is a phenyl radical.

References Cited
UNITED STATES PATENTS 3,013,044  12/1961  Schnabel _____ 260—448.2 B
3,114,759  12/1963  Lewis _____ 260—448.2 B DANIEL E. WYMAN, Primary Examiner P. F. SHAVER, Assistant Examiner